Aug. 28, 1934.  C. F. ANDERSON ET AL  1,971,892
MACHINE FOR MAKING FILING FOLDERS
Filed Dec. 4, 1931  5 Sheets-Sheet 1

Inventors:
Carl F. Anderson,
Ivan G. Anderson,
Attys.

Inventors:
Carl F. Anderson,
Ivan G. Anderson,
By Chindahl, Parker & Carlson
Attys.

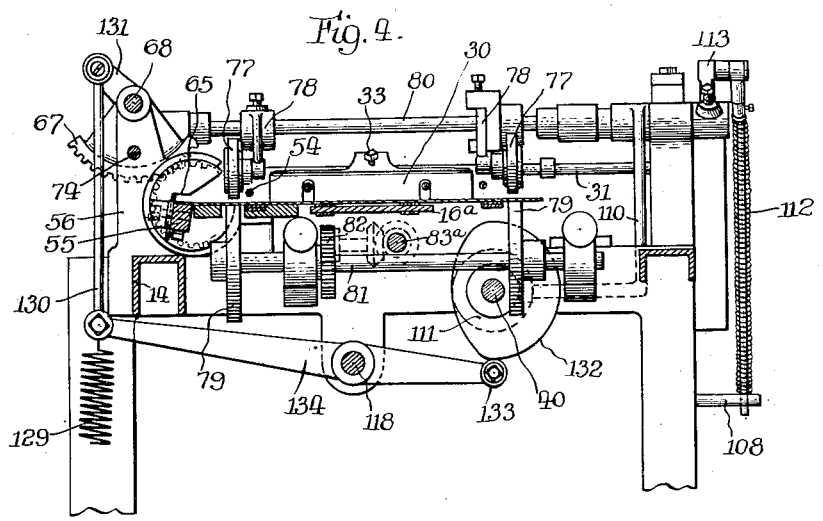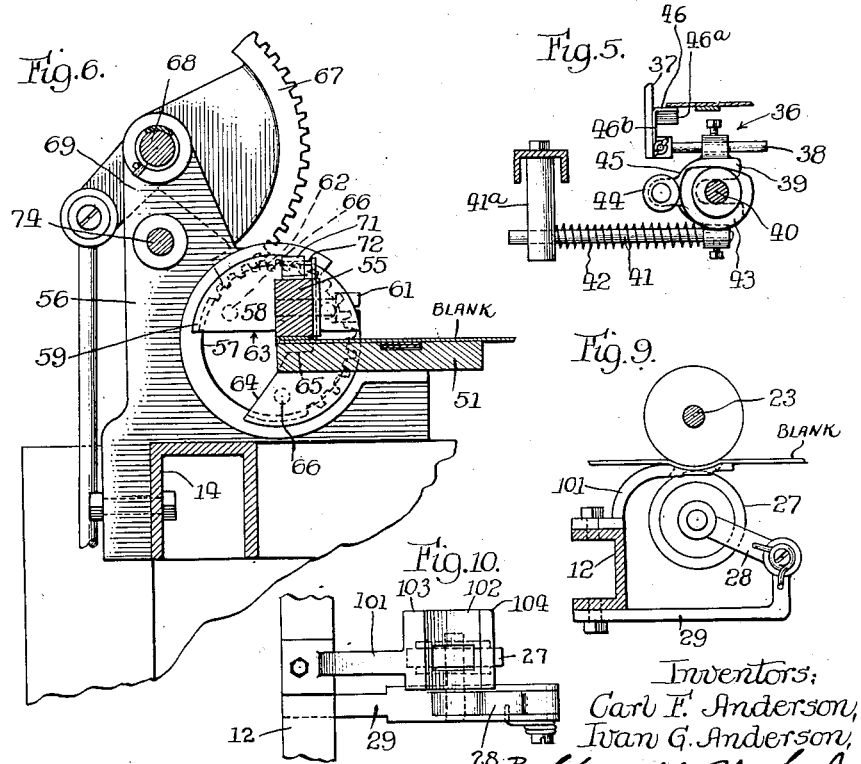

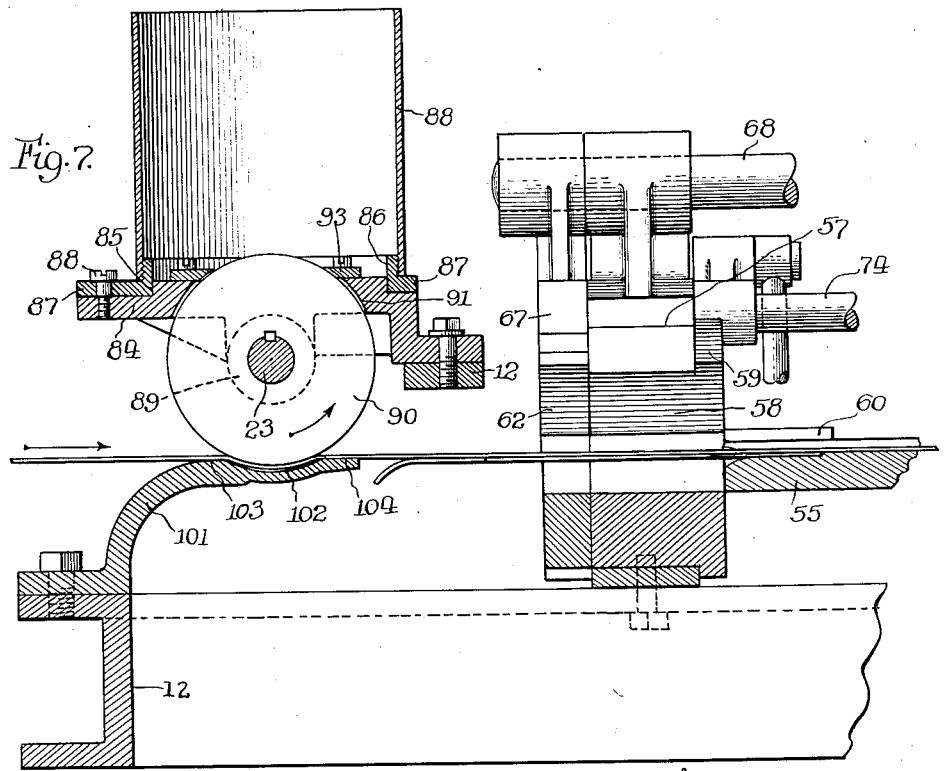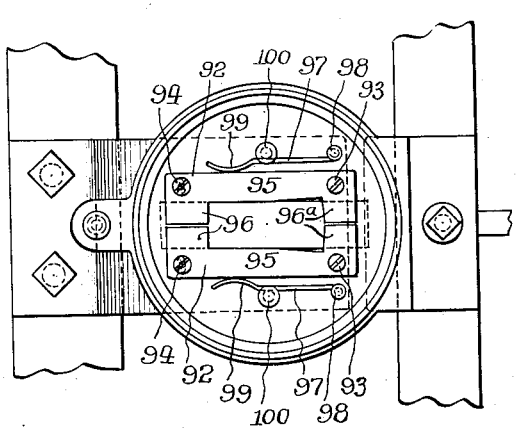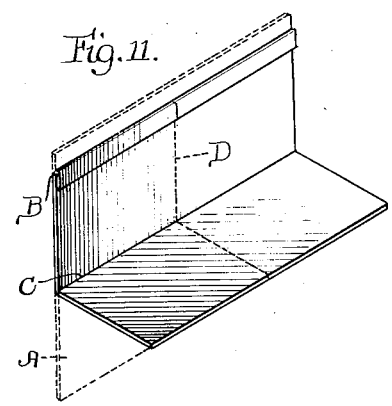

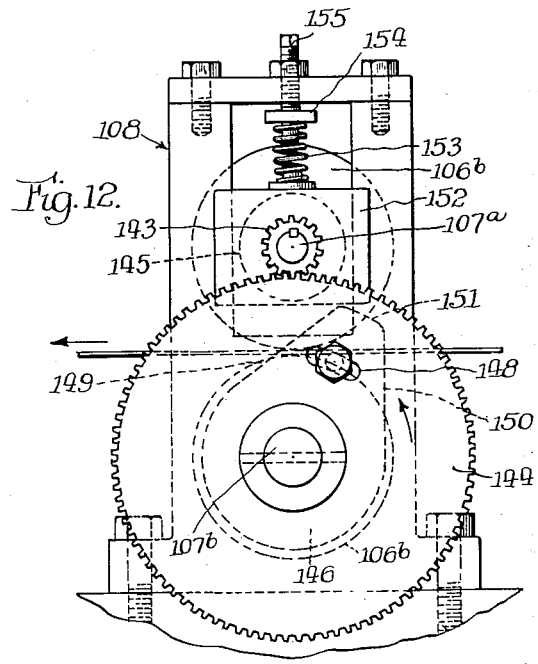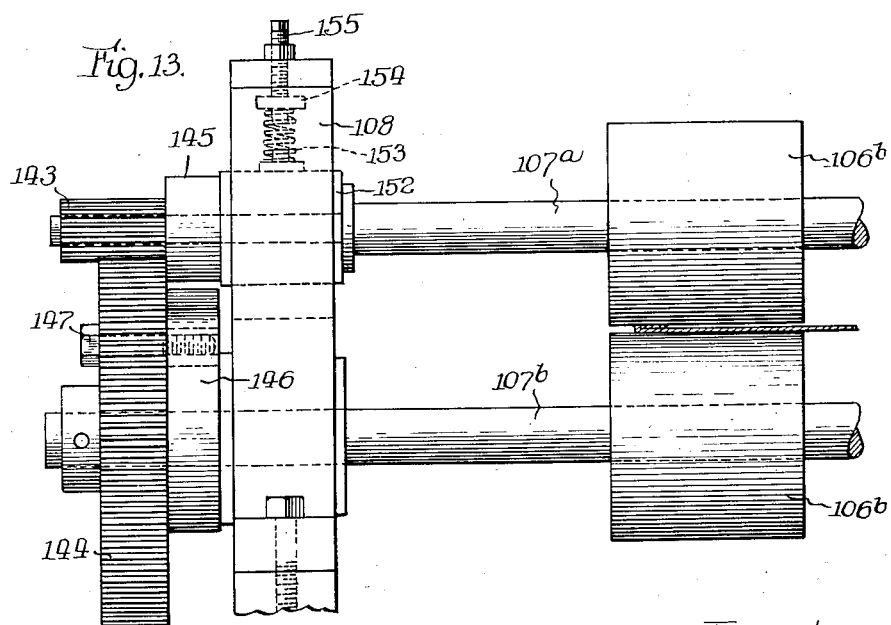

Patented Aug. 28, 1934

1,971,892

UNITED STATES PATENT OFFICE 1,971,892

MACHINE FOR MAKING FILING-FOLDERS

Carl F. Anderson and Ivan G. Anderson, Chicago, Ill.; Ivan G. Anderson administrator of said Carl F. Anderson, deceased Application December 4, 1931, Serial No. 578,952

21 Claims. (Cl. 93—1)

The invention relates generally to the formation of an improved type of filing folder.

It is an object of the invention to create a new and improved machine of this character which quickly and efficiently performs all of the operative stages necessary to gum, fold, and form a sheet of paper into a reinforced filing folder.

In prior machines for making filing folders of this type it has been necessary to suspend operations at frequent intervals to remove adhesive material from the blade that inserts the blank between the folding rolls. The present invention aims to provide a machine in which the functioning of the several cooperative instrumentalities employed in the forming of the folder will act without interference from the adhesive.

It is a further object of the invention to keep the blank under perfect control during the folding operation so that the fold shall be formed with accuracy.

Another object of the invention is the provision of a machine of the above character embodying a rotary adhesive applicator effective to contact the paper throughout an appreciable arc of its periphery to uniformly coat the latter with a layer of adhesive.

Other objects and advantages will become apparent from the following detailed description taken in connection with the accompanying drawings, in which:

Figure 1 is a fragmentary plan view of a file folder machine embodying the invention.

Figs. 2, 3, 4 and 5 are vertical elevational views taken along the lines 2—2, 3—3, 4—4 and 5—5 of Fig. 1 looking in the direction of the arrows identified with those respective planes.

Fig. 6 is an enlarged fragmentary elevational view looking toward the left hand end of Fig. 4.

Fig. 7 is an enlarged fragmental elevational view taken along line 7—7 of Fig. 1 and looking in the direction of the arrows.

Fig. 8 is a fragmental plan view of the parts shown in Fig. 7.

Fig. 9 is an elevational view of certain elements of a feeding mechanism.

Fig. 10 is a plan view of Fig. 9, some of the parts being removed.

Fig. 11 includes a diagrammatic view of a blank of paper stock in its initial form and a perspective view of the blank after being operated upon.

Fig. 12 is a fragmental end elevation of parts of the delivery end of the machine.

Fig. 13 is an elevational view of the parts shown in Fig. 12 looking toward the delivery end of the machine.

Generally considered the invention contemplates a machine organization adapted to perform a series of operations upon paper blanks fed successively thereto. It may be embodied in a machine of the general character of that shown in Patent No. 1,325,771 to C. F. Anderson. Herein I have illustrated only the novel portion of the machine, reference being made to said patent for an understanding of the mechanisms that operate upon the blank prior to and after the operations performed by the novel portion of the complete machine.

The present machine will be described as operating upon a blank A shown in dotted lines in Fig. 11 as comprising a rectangular sheet of paper stock or cardboard of suitable weight. The blank, previous to the entry thereof into the novel portion of the machine shown herein, and generally referred to as an operating section, is provided with longitudinal scores B and C intermediate its respective side edges and, if desirable, a suitable form of cutting means may be employed to trim the edges of the blank to the finished size. The score B is spaced inwardly from one edge of the blank a distance equal to the depth of a reinforcing strip which defines the upper edge of the folder and functions to resist tearing of the latter. The score C is positioned approximately centrally of the two side edges of the blank and identifies the bottom of the finished folder.

Subsequently, the sheet is moved into the operating section of the machine in cooperative relation with an adhesive applicator effective to coat the body of the stock immediately adjacent the score B, with a band of adhesive material. Thereafter a plurality of guide means and positioning members arrest the movement of the stock and register it in position to be operated upon by a folding mechanism, which, with its associated devices, functions to turn that portion of the paper extending from the score B to the adjacent edge reversely upon itself, the reversed portion being engaged by the previously applied band of adhesive.

The blank then progresses to that portion of the machine (not herein shown) where it is folded along the score C and severed along the line D to form two similar folders which are collected in a delivery chute such as that disclosed in the before mentioned patent to C. F. Anderson.

General machine organization

Figure 1:
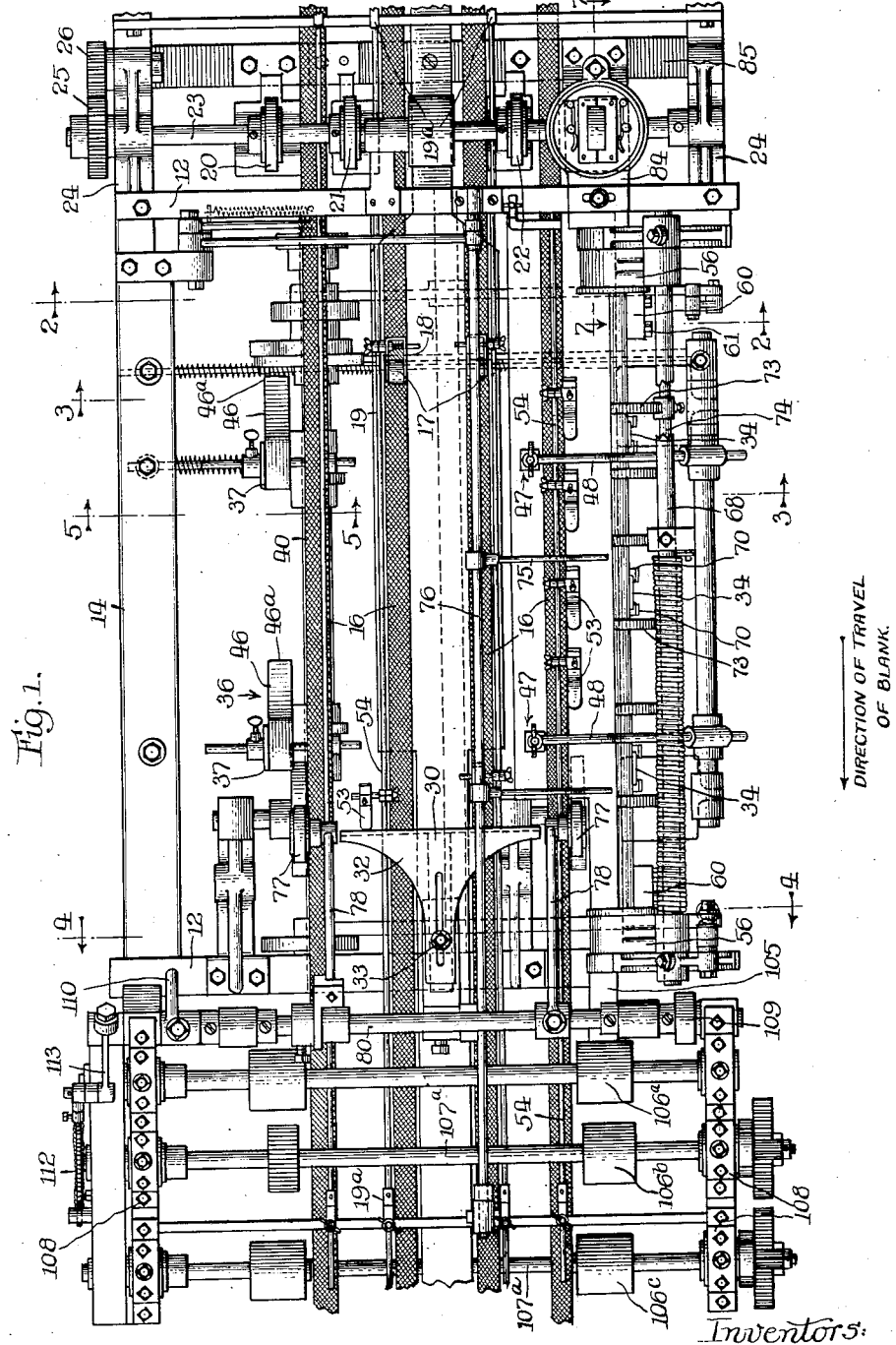
Figure 2:
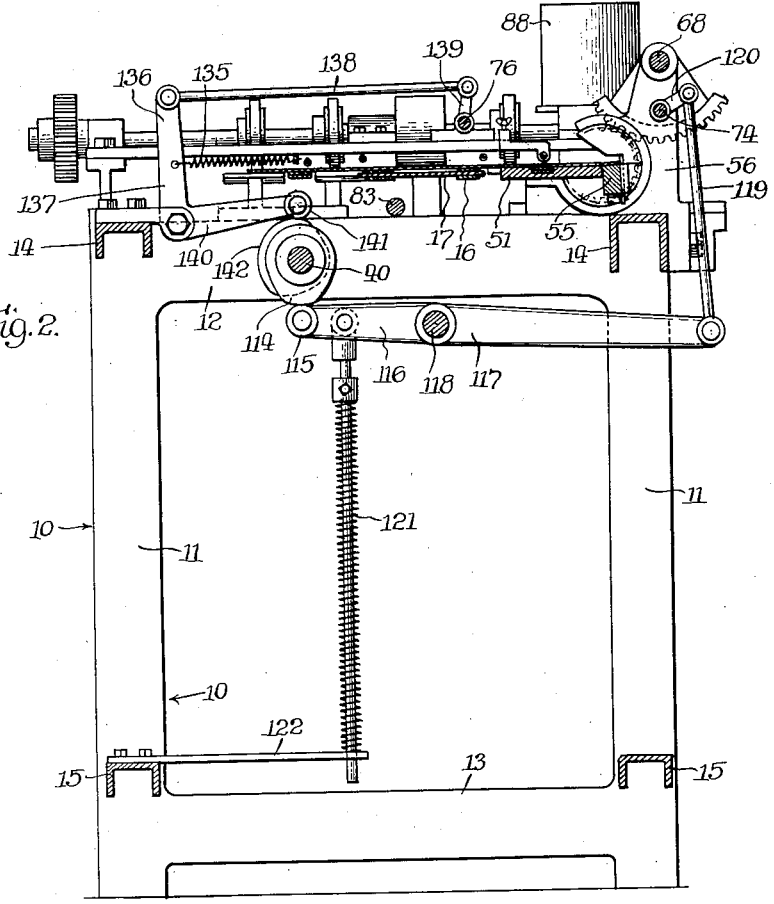

The various operating mechanisms are mounted on, and supported by, a frame 10 of suitable construction. As illustrated in Figs. 1, 2 and 4 the frame comprises a pair of end members 10 having vertical standards 11 and integrally formed upper and lower transverse connecting elements 12 and 13 respectively. The end members are connected in spaced relation by removable upper and lower side bars 14 and 15.

At the right hand end of the mechanism shown in Fig. 1 is a mechanism (not herein shown) such as that disclosed in the aforesaid patent to Anderson for the purpose of scoring and feeding blanks thereto. The left hand end of the machine as viewed in Fig. 1 extends to and cooperates with a folding, cutting and delivering assembly similar to that of said Anderson patent where the finished product is finally discharged.

The stock is transported through the machine on an endless conveyer extending from the feeding means, throughout the length of the operating section and terminating in the delivery end of the mechanism. In this instance the conveyer comprises a plurality of spaced endless tapes 16 operatively supported by suitable rollers (not shown) journaled in the respective feeding and delivery ends of the machine. The upper runs of the central pair of tapes are slidably supported upon an underlying plate 16$^a$ rigidly supported upon upright members (not shown), which are carried by the end frames of the operating section. Alined in overlying relation with two of the tapes, are a pair of similar rollers 17 effective to yieldingly press the sheet upon the traveling tapes. These rollers are carried in pivoted spring pressed brackets 18, which are in turn adjustably mounted on longitudinal rods 19, rigidly supported with respect to the frame of the machine by brackets 19$^a$. Uniform movement of the stock upon the tapes is further insured by the provision of a plurality of driven rollers 20, 21 and 22 non-rotatably secured to a transverse shaft 23, journaled in a pair of endwise extending brackets 24 secured to the machine frame. The rotary speed of shaft 23 is such that the peripheral surfaces of the rollers 21 and 22 move at a rate substantially equivalent to the rate of longitudinal travel of the tapes, such rotary movement being effected through a pair of intermeshing gears 25 and 26 operatively connected with the driving mechanism of the machine.

Similar spring-pressed feeding rollers 27, carried on pivoted arms 28 which in turn are rigidly carried by the frame of the machine through brackets 29 underly the rollers 21 and 22. The peripheral surfaces of the rollers 27 are fitted with tires of resilient material such as rubber which function to effect a frictional engagement with the under-surface of the stock and to maintain the latter in driving engagement with the respective rollers 21 and 22.

The blank A upon being carried forward by the conveyer tapes 16 and the driving rolls 20, 21 and 22 progresses across the operating section of the machine until its movement is arrested by a stop 30 (Fig. 1) mounted on a shaft 31 (Fig. 4) which in turn is adapted to be periodically oscillated in timed relation with the operation of the machine to move the stop into and out of blankarresting position. The stop 30 comprises a plate 32 adjustably secured to the shaft 31 by means of a pin and slot connection 33. The plate 32 is formed with a downwardly extending section the plane of which is substantially normal to the tapes 16, this normally extending section being effective to block the travel of the blank being carried by the tapes.

When the sheet has been brought to rest by the stop 30 it is moved transversely of the machine sufficiently to cause one of its edges to contact a plurality of spaced upstanding guides 34 (Fig. 3), which, together with the stop 30, define the position of the sheet preliminary to the initial folding operations. The transverse movement of the stock into registration with the guides 34 is accomplished by a pair of similar, intermittently actuated members 36 (Fig. 5). The members 36 comprise upstanding fingers 37 adjustably positioned upon a rod 38 so as to normally lie externally of the path of travel of that edge of the stock immediately opposite the guides 34. A forkshaped bracket 39 adjustably carries the rod 38, which in turn is slidable transversely of the machine on a rod 40 extending longitudinally of the operating section. The lower leg of the forkshaped bracket 39 is connected to a short guide shaft 41 the opposite end of which is slidably received in a strut 41$^a$ projecting from the adjacent connecting member 14. The part 39 and its associated finger 37 are normally urged toward the guides 34 to push the blank A against the latter by spring means 42 carried on the shaft 41 and interposed between the members 39 and the strut 41$^a$. The normal tendency of the fingers 37 to move into abutting relation with the stock is regulated by a cam 43 rigidly supported upon the shaft 40 and adapted to cooperate with a follower roller 44 rotatably supported upon a transversely extending arm 45, which in this instance, is formed integrally with the forked element 39.

The surface of the cam 43 defines a relatively long dwell period during which the finger 37 is maintained out of contact with the blank, and in addition, the cam surface contain a graduated area which is effective to permit the spring 42 to rapidly thrust the fingers 37 into engagement with the edge of the blank, the finger thereafter being rapidly retracted to its initial position. An inclined guide surface 46, (Figs. 1 and 5) preferably formed from an angularly turned plate, is fitted to each of the fingers 37 for the purpose of guiding the extreme edge of the blank into the plane of the tapes and into position to be operated upon by the fingers 37.

In the present instance the guides 46 comprise laterally extending guide surfaces 46$^a$ which underlie the path of the advancing longitudinal edge of the stock and substantially normal portions 46$^b$, rigidly secured to the inner vertical surface of the fingers 37. The guide surfaces 46$^a$ are inclined downwardly from left to right as viewed in Fig. 1, their extreme right hand ends being positioned below the plane of the tapes so as to guide the advancing edge of the paper upwardly into proper position.

After having been moved into registration with the stop 30 and guides 34 the sheet is restrained from displacement by a pair of similar holding devices 47 (Figs. 1 and 3) which are arranged to engage the sheet and firmly hold it in position during the subsequent operation of the folding devices. The holding devices 47 include a pair of arms 48 adjustably carried by a longitudinal shaft 49 which in turn is rocked to swing the arms toward and away from the plane of the blank. Similar, vertically adjustable contact parts 50 are mounted on the ends of the arms 48 and are adapted to engage the upper surface of the paper to bind the latter against a longitudinally extending plate 51 which underlies the parts 50. A longitudinal, rectangularly shaped groove 52 formed in the plate 51 accommodates that one of the tapes 16 which is nearest to the guides 34.

A plurality of similar guide fingers 53 (Figs. 1 and 3), adjustably carried on longitudinal rods 54 function to prevent buckling or upward curling of the blank as it is moved into, and retained in contact with, the respective guides 34 and the stop 30.

The folding mechanism

Means effective to fold the strip of stock defined between the score B and the adjacent edge of the paper, reversely upon the body of the blank so as to form a reinforcing edge on the folder is also provided. Referring to Figs. 1, 2, 3, and 4, an elongated bar 55 extending longitudinally of the machine in juxtaposition to the plate 51 is rotatably supported in underlying relation to that edge of the stock from which the reinforcing portion is formed. The inner or right hand upper edge of the bar as viewed in Fig. 4 substantially registers with the score B formed in the surface of the blank. The bar 55 is adapted to be rotated through substantially 180° from the position shown in Figs. 2, 3 and 4 to the position shown in Fig. 6 during which movement the reinforcing strip is folded upon the body of the paper as clearly indicated in Fig. 6.

The means for rotatably supporting the bar 55 include a pair of similar irregularly shaped bearing brackets 56 rigidly supported adjacent the respective ends of the operating section of the machine as shown in Fig. 1. The brackets 56 comprise an open arcuate bearing surface 57 (Figs. 6 and 7) the axis of which is coincident with that edge of the bar 55 which underlies the score A when the blank is in position to be operated upon.

Journaled for rotation in each arcuate bearing 57 is a segmental disk 58 one surface of which is provided with a radially projecting shoulder 59 adapted to engage the margin of the bearing 57 to restrict the part 58 against leftward movement as viewed in Fig. 7. The parts 58 are further provided with inwardly extending bosses 60 adapted to provide anchorages for the respective ends of the bar 55 to which the latter part may be removably secured as by means of machine screws 61 (Fig. 6).

The folding bar 55 is actuated through the medium of similar segmental gears 62 attached to the respective outer faces of the segmental bearing members 58. Referring to Figs. 4, 6 and 7 it will be noted that the bearing members 58, and their respective driving gears 62 are cut away along converging cords 63, 64, one of which; the cord 64 in this instance, terminates short of the normal point of intersection to define a short section 65 which parallels the cord 63 a distance substantially equivalent to the width of the blank defined between the score B and its adjacent edge.

These similar cut-away sections of the members 58 and their respective driving gears 62, are alined as indicated in Figs. 4 and 6, prior to the assembly of those elements in driving relation. The driving connection between the gears 62 and parts 58 is provided by similar counter-sunk machine screws diagrammatically illustrated at 66 in Fig. 6. Rotary movement is imparted to the gears 62 and their associated bearing members and consequently the folding bar 55 through a segmental gear 67 (Figs. 4 and 6) supported upon a shaft 68 which is journaled in upstanding arms 69 of the bearing brackets 56.

Provision is made for depressing the guide members 34 when the folding bar to which they are attached is rotated to the position shown in Fig. 6 in which it overlies the body of the paper stock. To this end the fingers 34 are reciprocably mounted in guides 70 (Fig. 1) attached to the right-hand vertical edge of the bar as viewed in Fig. 3. The fingers 34 are normally urged to their upper or effective position by yieldable means in the form of flat leaf springs 71 (Fig. 6) which engage pins 72 projecting laterally of the fingers adjacent their lower edges. Upon being rotated to the position shown in Fig. 6 as a result of the movement of the folding bar, the upper ends of the guide fingers 34 contact the surface of the blank and are pushed upwardly as shown in that view against the action of their respective springs.

Figure 3:
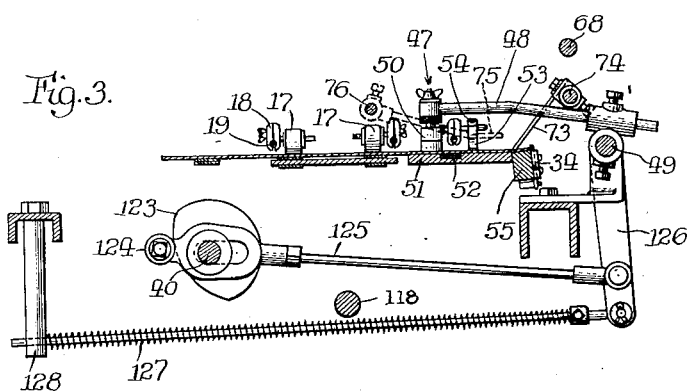

The reinforcing portion of the blank is prevented from buckling or otherwise moving from position in registry with the inner edge of the folding bar during the early stages of the movement of the latter by means of a plurality of fingers 73 (Figs. 1 and 3) adjustably positioned upon a shaft 74 which in turn is journaled for rotary movement in the bearing brackets 56. The fingers 73 project downwardly into engagement with the blank as shown in Fig. 3, their respective lower ends contacting the paper on a line adjacent to, but externally of the score B. The shaft 74 is intermittently oscillated in timed relation to the movement of the folding bar 55 in a manner such as to cause the fingers 73 to remain in engagement with the blank until the bar has effected a definite turning of the latter along the score. Thereafter the fingers are rotated out of obstructing relation to the folding bar to permit the latter to complete the folding operation.

After restoration of the folding bar to its initial position the folded edge of the blank is held down by a pair of spaced fingers 75 (Figs. 1 and 3) adjustably mounted upon a longitudinally extending shaft 76 which is actuated in timed relation with the movement of the folding bar so as to depress the fingers 75 into operative engagement with the blank as the folding bar is restored to its initial position.

After having been operated upon by the folding mehcanism the stop 30 is automatically elevated out of blocking position with respect to the blank, whereupon a pair of idler rollers 77 (Figs. 1 and 4) journaled at the extremities of arms 78 are depressed into engagement with the paper to force the latter into contact with a pair of similar driving rollers 79. Rocking of the idler rollers 77 into contact with the blank is effected through a transverse shaft 80 (Figs. 1 and 4) journaled in the machine frame and operatively associated with the driving mechanism. The driving rollers 79 are supported on a transverse shaft 81 which is drivingly connected with the main shaft of the machine by means of a gear train 82, 83.

The gumming mechanism

A gum, or adhesive material is applied to the blank preferably prior to the folding operation to retain the reinforced edge in intimate contact with the body of the paper. Referring particularly to Figs. 2, 7 and 9 such means in this instance comprises an adhesive applicator adapted to act upon the paper blank as it is conveyed into operating position by the tapes 16.

A bracket 84 is adjustably secured to the right hand upper frame member 12 and extends laterally therefrom as shown in Figs. 1 and 7 to overlie the shaft 23. A circular, recessed shoulder 85, formed in the upper surface of the bracket 84 has removably fitted therein an annular, externally threaded base ring 86 with which a laterally extending peripheral flange 87 is integrally formed. The flange 87 receives a shouldered machine screw 88 which is threaded into the bracket 84 to maintain the parts in assembled relation. Removably threaded on the base ring 86 is a cylindrical receptacle 88 of sufficient height to contain an appreciable quantity of adhesive material. Depending from the bracket 84 eccentrically of its longitudinal axis is an integrally formed bearing 89 which serves to journal the shaft 23.

Keyed to the shaft 23 for rotation therewith is an applicator wheel 90 whose upper surface projects into the interior of the adhesive receptacle 86 through an aperture 91 formed in the bracket 84. The aperture 91 closely approximates the contour of that section of the wheel 90 which projects therethrough, the respective side walls of the aperture extending parallel with the opposite faces of the wheel and the end walls being arcuately shaped on a radius concentric with the axis of the wheel. It will be evident that the wheel 90 will rotate with the shaft 23 in the direction indicated by the arrow in Fig. 7 and that such rotary movement will cause its peripheral edge as well as those portions of its sides which project above the interior of the receptacle to become coated with the adhesive material contained therein.

The peripheral face of the applicator wheel is substantially the width of the reinforcing edge of the blank so that it is adapted to coat the blank with a band of adhesive sufficiently wide to engage the entire area of the folded edge.

Means is provided to regulate the amount of adhesive carried from the receptacle by the wheel in its movement therethrough. Referring to Fig. 8, such means, in this instance, comprises a pair of similar wiping plates 92 pivoted adjacent their respective right-hand corners on screws 93 which are threaded into the bracket 84. At their opposite ends the plates 92 are guided for slight arcuate movement toward and away from the wheel and in sliding contact with the bracket 84 by means of shouldered screws 94 which project through arcuately shaped slots in the ends of the plates into threaded engagement with the bracket 84. The shouldered heads of the screws 94 form bearing engagements with the upper surfaces of the plates to maintain them in contact with the surface of the bracket.

As shown in Fig. 8 the plates 92 comprise elongated central sections 95 which substantially contact the side faces of the wheel 90, and normally disposed end pieces 96 and 96ª, which are adapted to contact the peripheral surface of the wheel. The plates are normally urged into scraping contact with that portion of the peripheral surface and the side faces of the wheel which are rotating out of the receptacle so as to remove excess adhesive material therefrom. In this embodiment of the invention a pair of leaf springs 97 anchored at corresponding ends to similar pins 98, and provided adjacent their opposite ends with arcuately shaped contact surfaces 99, act against the plates 95 to yieldably urge them into contacting relation with the side faces and peripheral surface of the wheel. A pair of shouldered studs 100, carried in the bracket 84 provide intermediate guides for the spring fingers and force them into contact with the plates. In Fig. 8 it will be observed that those edges of the elongated parts of the plates 95 adjacent the wheel 90 are relieved slightly from a point opposite the center of the wheel to their respective right hand ends to prevent bearing contact with those portions of the side faces of the wheel which are entering the adhesive receptacle. The end elements 96ª of each plate on the entering side of the wheel are similarly relieved from bearing engagement with the peripheral surface thereof so that any excess adhesive left on the wheel after contacting the blank is returned to the receptacle.

It will be apparent that ready access to the plates 95 for the purposes of cleaning or renewing may be had by merely unscrewing the part 88 of the adhesive receptacle.

The adhesive applicator is made to simultaneously contact an appreciable area of that portion of the surface of the blank which is to be coated, so as to effect a more complete and uniform application of adhesive material. To this end the lower peripheral edge of the wheel 90 projects below the plane defined by the upper surface of the conveying tapes 16, and the advancing blank is caused to contact the entire length of the lower arc of the wheel so subtended by the plane of the tapes.

A plurality of guide arms 101 (Fig. 7) rigidly supported by and projecting leftwardly (as viewed in Fig. 1) from the transverse frame member 85, underlie the respective rollers 20, 21, and 22 as well as the adhesive applicator 90 and each arm comprises a concave arcuate section 102 spaced from, and of substantially the same radius as the peripheral surface of the wheels which they underlie. The arcuate sections 102 of the arms 101 terminate in short guide surfaces 103 and 104 which lie in the common plane of the tapes 16 on either side of the rollers 20, 21, 22, and the applicator wheel 90.

Referring to Fig. 1 it will be apparent that the advancing edge of the blank stock, upon reaching the line of rollers 20, 21, and 22 and the adhesive applicator 90, will be deflected downwardly between the several plate 101 and the bottom edges of the respective rollers to assume an arcuate shape as shown in Fig. 7, the applicator 90 meanwhile contacting the relatively extensive area of the sheet defined by the length of the arc 102 and the width of the peripheral face of the applicator which latter dimension is preferably equivalent to the width of the folded section of the blank which forms the reinforced edge.

Means effective to compel an intimate cementing of the reenforced edge of the body of the blank is provided. A plow 105 (Fig. 1), positioned in the path of the advancing folded edge of the stock terminates in juxtaposition to the first of a plurality of superimposed pairs of pressing rollers 106ª, 106ᵇ, 106ᶜ which are supported upon sets of upper and lower transverse shafts 107ª and 107ᵇ journaled in leftward extending longitudinal brackets 108. Thus when the periodically actuated stop 30 is elevated from its blocking position, the blank moves leftwardly as viewed in Figure 1, and, in the event the folded edge is not retained in contact with the body of the blank as a result of the action of the bar 55, the plow is effective to guide the parts into such proximity as will permit them to be received between the first set of rollers 106. Thereafter the blank passes between each of the remaining sets of similar rollers as a result of which the folded edge is made to firmly and intimately adhere to the adhesive coated body of the paper.

As the gummed and folded paper advances longitudinally of the machine (from right to left as viewed in Fig. 1), the pressing rollers 106ª, 106ᵇ, 106ᶜ successively engage the folded edge tending to squeeze any excess adhesive toward the rear or following edge of the stock where it is extruded and comes into contact with the rollers. This result is objectionable for the two-fold reason that the accumulating of adhesive on the rollers interferes with their continuous operation and constitutes a source of difficulty at the delivery end of the machine by reason of its tendency to stick to successive folded and pressed sheets.

In this connection the last two of the successive sets of pressing rollers are provided with means adapted to effect their separation immediately prior to the passage of the following edge of the paper therethrough. It will be understood of course that the same means might be applied to all or any lesser number of sets of pressing rollers dependent upon the characteristics of the adhesive, and the weight and nature of the paper stock being used. Referring particularly to Figs. 12 and 13, the shafts 107ª and 107ᵇ, carrying the second and third sets of rollers 106ᵇ and 106ᶜ, project externally of the bearing brackets 108, the upper shaft of each set being provided at its extreme end with a non-rotatably fitted spur gear 143 adapted for meshing engagement with a gear 144 loosely mounted on the external end of the lower shaft 107ᵇ. A roller 145 loosely journaled on the upper shaft 107ª, intermediate the spur gear 143 and the bearing 108 is effective to cooperate with a cam 146 which is journaled on the lower shaft 107ᵇ and secured to the gear 144 for rotation therewith.

Angular adjustment of the cam relative to the gear is effected by means of a headed screw 147 which projects through an arcuate slot 148, in the web of the gear, into engagement with a threaded bore in the body of the cam. The cam 146 contacts the roller 145 once in each revolution of the gear 147 to elevate the upper shaft 107ª sufficiently to relieve the pressure being exerted by the upper roller 106ᵇ upon the folded edge of the paper stock. To this end the cam is provided with a pair of similarly inclined advancing and following surfaces 149 and 150, between which is a short dwell surface 151, the radius of which is only slightly greater than the distance between the center of the lower shaft 107ᵇ and the peripheral surface of the roller 145, so that the extent to which the upper shaft is elevated is not sufficient to move the spur gear 143 out of mesh with the gear 144.

Vertical movement of the upper shaft is provided for by a slide bearing 152, normally urged to its downward position by means of a spring 153, acting between the upper surface of the bearing and a collar 154 adjustably mounted on a stud 155. The spring 153, maintains the spur gear 143 in mesh with the driven gear 144 and exerts a constant force which is operable through the respective rollers 106ª, 106ᵇ, and 106ᶜ to press the folded edge of the paper stock into contact with the adhesive coated section of its body portion.

It will be apparent that the ratio of the number of teeth in the spur gear 143 to the number of teeth in the driven gear 144 will be dependent upon the length of the blank being operated on as compared with the diameter of the pressing rollers. In the present instance the spur gear is formed with 14 teeth, whereas the driven gear is formed with 98 teeth, resulting in seven complete revolutions of the spur gear to a single rotation of the driven gear. The length of the dwell surface on the cam 146 is preferably such that the upper pressing roller is lifted from engagement with the blank between one quarter of an inch to one half of an inch prior to the passage of the following edge of the paper thereunder.

The operation

In connection with the operation of the machine it will be remembered that the blanks are successively delivered to that portion of the mechanism which has been designated the operating section, after having been scored at C and B in the feeding end of the machine. The blanks are then transported on the tapes 16 with the respective scores extending longitudinally of the line of travel, the score B being nearest the adhesive applicator. This feeding movement carries the stock between the driving rollers 21 and 22 and their respective underlying idler rollers 27 which function to prevent twisting of the paper during the concurrent action of the applicator in applying a band of adhesive adjacent to, but inwardly of, the score B.

The blank progresses until its movement is interrupted by the periodically operated stop 30 which remains in its blocking position throughout the folding operation. After having been brought to rest the stock is moved laterally of the tapes by the fingers 37 which effect a registration with the oppositely disposed guides 34. Thereafter the paper is clamped in registered position through the action of the members 50 which contact its upper surface to bind the latter in engagement with the underlying stationary plate 51. The alined fingers 73 then engage the upper surface of the paper in a line adjacent to the score B and on the side thereof opposite the band of adhesive. While the fingers 73 are in engagement with the paper the folding member 55 commences a rotary movement on an axis substantially coincident with the score B, the fingers 73 meanwhile preventing any tendency of the edge to buckle and inducing a folding of the blank along the line defined by the score.

The rotary movement of the folding bar continues until the strip comprising the reinforcing area has been folded reversely on the body of the stock, the alined fingers 73 having been oscillated to a non-obstructing position in timed relation with the action of the folding bar. It will be recalled that the guides 34 are reciprocably mounted to permit the bar to turn the edge of the stock into intimate contacting relation with the adhesive coated surface thereof.

As the folding bar is rotated out of the position shown in Fig. 6 the guide fingers 34 are permitted to again move to their normal position under the influence of the springs 71. As the restoration of the folding bar is completed the fingers 75 are moved downwardly into overlying relation with respect to the folded section of the stock to restrain the latter against any possible tendency to unfold.

The stop 30 is then elevated out of locking position and the idler rollers 77 are lowered into contact with the upper surface of the sheet to cause the latter to engage the underlying driving rollers 79. The blank is again transported longitudinally of the machine, the turned edge being guided under the pressing rollers 106ª, 106ᵇ, 106ᶜ to insure an intimate contacting relation between the folded section and the adhesive material on the body of the stock.

Subsequently the blank passes into that portion of the machine where it is severed along the line D and the finished reinforced filing folders are collected for removal.

*The driving connections*

The several instrumentalities of the machine which operate upon the blank to form the reenforced edge are driven in the present embodiment of the invention from the shaft 40 which, as has been indicated, extends longitudinally of the machine and is journaled in suitable bearings supported by the upper transverse end frames 12. The shaft 40 extends to the right as viewed in Figure 1 into the feeding end of the machine where it is operatively connected to a prime mover such, for example, as an electric motor.

The conveying means comprising the tapes 16 are operatively associated with the prime mover, so as to derive continuous motion therefrom, by a suitable gear train (not shown), and the shaft 23 with its driving rollers 20, 21 and 22 are connected with the prime mover by means including the gear train 25, 26.

The periodically actuated stop 30 and its operating shaft 31 are oscillated by a pair of vertically aligned intermeshing segmental gears, the upper one of which, 109 is carried upon the lower end of the shaft 80 as viewed in Figure 1, the second (not shown) being non-rotatably attached to the shaft 31. A rocking movement is communicated to the shaft 80, and thus to the shaft 31, through the medium of a rigidly connected, depending arm 110, the lower section of which extends laterally as viewed in dotted lines in Figure 4 to position a cam follower on the end thereof in bearing engagement with a cam face 111 which rotates with the shaft 40. The operating arm 110 is maintained in contact with the cam face 111 by yieldable means comprising a coiled spring 112 acting between a fixed stop carried on the machine frame and a crank arm 113 rigidly secured to the shaft 80 and extending radially therefrom at such an angle to the arm 110 as to permit the spring to exert a rotating influence upon the shaft in opposition to the movement communicated to the latter by the arm. As has been indicated, when the stop 30 is depressed to block the path of the advancing paper, the guide fingers 37 move into contact with one of its adjacent edges to shift the paper transversely of the tapes into registry with the guides 34.

As previously described, the reciprocating movement of the fingers 37 is derived from cam 43 which, like the cam 111, is also secured to the shaft 40 and acts through a follower 44 and a bracket 39 to shift the fingers against the action of springs 42.

With the paper in registration with the guides 34 and stop 30, the fingers 73 are rocked into engagement with the surface of the blank through the action of a cam 114 carried on the shaft 40 and cooperating with a follower 115 mounted on one arm 116 of a lever 117 which is pivotally supported on a shaft 118 extending longitudinally of the machine. The opposite arm of the lever 117 is connected to the shaft 74 which supports the fingers 73 by means of a link 119 and a crank arm 120. The follower roller 115 is maintained in engagement with the peripheral face of the cam 114 by means of a spring 121 which acts between a fixed abutment 122 and the arm 116.

It will thus be apparent that the fingers 73 are yieldingly retained in engagement with the surface of the blank so as to obviate the possibility of interference between the folding bar and the fingers after the former commences its rotary movement to effect turning of the reenforcing edge of the blank.

The holding members 50 which restrain the blank against movement during the folding operation are actuated by a cam 123 mounted upon the shaft 40 and operatively associated with a follower 124 which in turn is connected with a link 125 and lever arm 126 to rock the shaft 49. The holding members 50 are positively moved out of engagement with the blank by the cam 123, while a spring 127, acting between a fixed stop 128 and the end of the arm 126, functions to maintain the follower in contact with its cam and to yieldingly press the fingers into engagement with the blank.

The folding bar 55 is yieldably rotated to effect a folding of the edge of the stock through the medium of a spring 129 anchored at its lower end to a fixed part of the machine (not shown) and connected at its upper end to a link 130, the opposed end of which is pivoted to an arm 131 formed integrally with and extending angularly from, the gear segment 67. The folding bar is positively restored to inoperative position through the action of a cam 132 which operates upon a follower 133 carried by a lever 134 pivotally supported on the shaft 118. The opposite end of the lever 134 is connected to the link 130. As viewed in Fig. 4, it will be apparent that the cam 132 functions to rock the lever 134 in a clockwise direction so as to impart an upward movement to the link 130 to restore the bar 55 to its initial position.

After completing the folding operation, the fingers 75 are moved into engagement with the folded edge of the stock to temporarily retain the latter in position. Movement of the fingers 75 is effected through the action of the coiled spring 135 acting between a fixed stop and an arm 136 of a bell crank 137. A link 138 connects the arm 136 with a lever 139 which in turn is rigidly attached to the finger rock shaft 76. The second arm 140 of the bell crank 137 is provided with the follower roller 141 which coacts with a cam 142 rigidly secured to the shaft 40. The cam 142 operates to rock the bell crank 137 in a counter-clockwise direction as viewed in Figure 2 to elevate the fingers 75 out of engagement with the blank.

The idler rollers 77 which are rocked downwardly to bind the blank in engagement with the driving rollers 79 after the reinforcing fold has been completed, are actuated simultaneously with the movement of the stop 30 to its upward or non-blocking position. As has already been indicated, the rollers 77 are carried at the extremities of arms 78 which in turn are non-rotatably secured to the shaft 80. The shaft 80, it will be remembered, is periodically rocked through the co-action of a cam 111 and an arm 110 the movement of the shaft 80 being communicated to the stop 30 through the segmental gears 109. Thus a predetermined relationship between the movement of the rollers 77 and the stop 30 is assured.

While the invention is susceptible of various modifications and alternative constructions, we have shown in the drawings and have herein described in detail the preferred embodiment, but it is to be understood that we do not thereby intend to limit the invention to the specific form disclosed, but intend to cover all modifications and alternative constructions falling within the

We claim as our invention:

1. The method of forming a file folder from a blank having a previously cut score extending parallel with and adjacent to one of its edges to define an elongated strip, including the steps of applying a band of adhesive to the body of the blank on the side of the score away from said strip, and folding said strip upon the body of the blank into contact with the band of adhesive while the body of the blank is held stationary.

2. The method of forming a reinforced file folder from a paper blank, comprising the steps of coating one surface of the body of the blank with a band of adhesive substantially parallel to and removed from, that edge of the blank which is to be folded and engaging the opposite surface of the blank to fold the latter reversely upon itself into contact with the band of adhesive while the body of the blank is held stationary.

3. The method of operating on a paper blank to form a reinforced edge comprising the steps of conveying the blank to operating position and applying a coating of adhesive intermediate its edges during said conveying movement, stopping and registering said blank in operating position, folding one edge thereof reversely upon the body of the blank into contact with the adhesive, moving said blank out of operating position, and pressing said folded edge into intimate contact with said adhesive during said last mentioned movement.

4. The method of forming a file folder from a blank having a previously cut score extending parallel with, and adjacent to one of its edges to define an elongated strip, including the steps of applying a band of adhesive to one surface of the blank on the side of said score away from said strip, contacting the same surface of the blank at a plurality of points defining a line on the side of said score away from said adhesive, and thereafter engaging the opposite surface of the blank to fold said strip reversely upon the body of the blank into contact with said adhesive, said line contact being released subsequent to commencing of said folding action.

5. The method of operating on a paper blank to form a reinforced edge comprising the steps of conveying the blank to operating position and applying a coating of adhesive material to a portion of one surface of the blank intermediate its edges during said conveying movement, stopping and registering said blank in operating position, engaging the same surface of said blank along a line defining a position for a fold and engaging the opposite surface of said blank to effect a folding thereof along said previously defined line, and pressing said folded portion into intimate contact with said adhesive.

6. The method of folding and cementing the edge of paper stock to form a reinforced section comprising the steps of applying a coating of adhesive to an area of the stock removed from the edge to be folded a distance substantially equal to the width of the fold, engaging the same surface of the blank in a line defining the fold, and engaging the opposite surface of the paper to effect a fold along said previously defined line and a reversal of the folded section upon the body of the blank into contact with said adhesive.

7. A machine of the character described comprising in combination, means for carrying a sheet having a previously formed score adjacent one of its edges, longitudinally of the machine, means for applying a band of adhesive material to said sheet, said adhesive material extending from said score in a direction away from the adjacent edge, means for stopping the sheet in its longitudinal movement, intermittently operable means for registering the sheet in a position to be operated upon, means for folding the sheet reversely upon itself along said score, means for effecting a continuation of the longitudinal movement of said sheet and means operable during said continued longitudinal movement to press said folded edge into intimate contact with said adhesive material.

8. A machine of the character described comprising in combination, means for carrying a sheet having a previously formed score adjacent one of its edges, longitudinally of the machine, means for applying a band of adhesive material to said sheet, said adhesive material extending from said score in a direction away from said adjacent edge, means for stopping the sheet in its longitudinal movement, periodically actuated means for registering the sheet in a position to be operated upon, means for folding the section of said sheet lying between said score and the adjacent edge reversely upon itself into contact with said adhesive, means for effecting a continuation of the longitudinal movement of said sheet and means for pressing said folded section into intimate contact with said adhesive material.

9. A machine of the character described comprising in combination, means for carrying a sheet to be operated upon longitudinally of the machine, said sheet having a previously formed longitudinal score adjacent one of its edges, means for applying a longitudinal band of adhesive material to said sheet during said longitudinal movement, said adhesive material extending from said score in a direction away from said last mentioned edge, means for stopping the sheet in its longitudinal movement, means for registering the sheet in a position to be operated upon, means for folding the sheet upon itself along said score, means for effecting a continuation of the longitudinal movement of said sheet, means for pressing said folded edge into intimate contact with said adhesive material, a continuously operating source of power, and operative connections between said power source and said before mentioned means effective to provide a timed sequential movement thereof.

10. A machine of the character described having in combination, means for carrying a sheet longitudinally of the machine, said sheet having a previously formed longitudinal score adjacent one of its edges, means for applying a longitudinal band of adhesive material to said sheet during said longitudinal movement, said adhesive material extending from said score in a direction away from said last mentioned edge, means for stopping the sheet in its longitudinal movement, means for adjusting the sheet in a position to be operated upon, means for folding the sheet upon itself along said score, means for effecting a continuation of the longitudinal movement of said sheet, means for pressing said folded edge into intimate contact with said adhesive material, and a common driving means with which said beforementioned means are articulated.

11. A machine for making vertical filing folders with a reinforced upper edge comprising in combination, means for applying a band of adhesive material to said sheet adjacent to, but remote from one edge thereof, a plurality of pivoted fingers to engage said sheet in a line defining a fold, rotary means to fold said sheet along said line and means effective seriatim to move said fingers into engagement with said paper, to actuate said folding means and to release said fingers and restore said folding means to normal position.

12. In a file folder forming machine, the combination of folding means operating on a blank having a previously cut score extending parallel with and adjacent to one of its edges to define an elongated rectangular strip, and a gummed portion of substantially the width of said strip extending adjacent to, and on the side of said score away from said strip, said folding means including an elongated bar adapted for pivotal movement about a longitudinal axis substantially coincident with said score from an initial position underlying said strip to a position overlying said blank, and finger means effective to prevent displacement of said strip upon initiating movement of said folding bar.

13. In a file folder forming machine, the combination of folding means operating on a blank having a previously cut score extending parallel with and adjacent to one of its edges to define an elongated rectangular strip, said folding means including an elongated bar adapted for pivotal movement about a longitudinal axis from an initial position underlying said strip to a position overlying said blank, and automatically actuated finger means to engage said sheet to prevent displacement of said folding strip upon initiating movement of said folding bar.

14. In a file folder forming machine, the combination of folding means operating on a blank having a previously cut score extending parallel with and adjacent to one of its edges to define an elongated rectangular strip, said folding means including an elongated bar adapted for pivotal movement about a longitudinal axis from an initial position underlying said strip to a position overlying said blank, automatically operated finger means to prevent displacement of said folding strip upon initiating movement of said folding bar and means to retain said strip in folded position after said folding bar is restored to initial position.

15. A machine of the character described having in combination, means for conveying a sheet longitudinally of the machine, said sheet having a previously formed longitudinal score adjacent one edge thereof, means for applying a band of adhesive material to the top of said sheet adjacent said score and on the side thereof removed from said adjacent edge, periodically operable means for stopping the sheet in its longitudinal movement, periodically operable means for registering the sheet in a position to be folded, intermittently actuable means on the under side of said sheet to fold the sheet reversely upon itself along said score, means for pressing said folded edge into intimate contact with said adhesive material, and a common driving means with which each of said beforementioned means is articulated.

16. A machine of the character described having in combination, means for conveying a sheet longitudinally of the machine, said sheet having a previously formed longitudinal score adjacent one edge thereof, means for applying a band of adhesive material to the top of said sheet adjacent said score and on the side thereof removed from said adjacent edge, periodically operable means for stopping the sheet in its longitudinal movement, means acting in timed relation with said stopping means to register the sheet in a position to be folded, means acting on the under side of said sheet for folding the sheet upon itself along said score, and driving means to actuate said beforementioned means seriatim.

17. In a folding machine, the combination of means forming a surface on which a scored blank may be supported in a plane position, means to register a blank preliminary to a folding operation means to hold a blank in registration during the folding operation, and finger means effective to compel a fold to occur along said score, said surface forming means comprising a portion pivoted to swing through an arc of 180° upon an axis substantially coincident with said score.

18. In a folding machine, the combination of means forming a surface on which a blank may be supported in a plane position, said means comprising a folding portion pivoted to swing through an arc of substantially 180°, and means to engage the surface of said blank to define a line along which a fold is to be made, said line substantially coinciding with the pivotal axis of said folding portion.

19. A machine of the character described, having in combination, means to apply an adhesive material to a blank, means to fold a portion of the blank into overlying relation with respect to said adhesive, a pair of pressing rollers effective to force the folded portion of the blank into intimate engagement with said adhesive, means to advance the blank into position to be engaged by said rollers and automatically operable means to release said rollers from engagement with said folded portion prior to the passage of the following edge of the blank therebetween.

20. A machine of the character described, having in combination, means to apply a band of adhesive adjacent one edge of a blank, means to fold the said adjacent edge of the blank into overlying relation with respect to said adhesive, a pressing roller operable to force the folded portion of the blank into intimate engagement with said adhesive, means to effect relative movement of said roller and blank longitudinally of the folded edge of the latter and means to release said roller from engagement with said blank adjacent the following edge thereof.

21. In a machine of the character described, the combination of means for applying adhesive to the surface of a blank, means for folding a portion of the blank adjacent said adhesive, and means to press said folded portion into contacting engagement with the adhesive, said last mentioned means being arranged to be rendered inoperative adjacent an edge of the blank to prevent the extrusion of surplus adhesive.

CARL F. ANDERSON.
IVAN G. ANDERSON.